(12) United States Patent
Kondoh

(10) Patent No.: US 7,198,251 B2
(45) Date of Patent: Apr. 3, 2007

(54) OPENING/CLOSING MECHANISM FOR VACUUM PROCESSING APPARATUS AND VACUUM PROCESSING APPARATUS USING THE SAME

(75) Inventor: Keisuke Kondoh, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 11/312,607

(22) Filed: Dec. 21, 2005

(65) Prior Publication Data

US 2006/0131278 A1    Jun. 22, 2006

Related U.S. Application Data

(60) Provisional application No. 60/663,261, filed on Mar. 21, 2005.

(30) Foreign Application Priority Data

Dec. 21, 2004   (JP)   ............................. P2004-368817

(51) Int. Cl.
*F16K 25/00*   (2006.01)

(52) U.S. Cl. ...................................... 251/193; 251/250

(58) Field of Classification Search ................ 251/193, 251/195, 158, 167, 301, 302, 203, 250, 289

See application file for complete search history.

(56) References Cited

U.S. PATENT DOCUMENTS

| | | | |
|---|---|---|---|
| 5,330,157 A * | 7/1994 | Dern et al. ................. | 251/162 |
| 6,082,706 A * | 7/2000 | Irie ............................. | 251/158 |
| 6,299,133 B2 * | 10/2001 | Waragai et al. ............. | 251/193 |
| 6,390,448 B1 | 5/2002 | Kroeker et al. ............. | 251/167 |
| 6,390,449 B1 * | 5/2002 | Ishigaki et al. ............. | 251/193 |
| 6,431,518 B1 * | 8/2002 | Geiser ........................ | 251/193 |
| 6,454,241 B2 * | 9/2002 | Tamura et al. .............. | 251/193 |
| 6,488,262 B1 * | 12/2002 | Oka ............................ | 251/193 |
| 6,564,818 B2 * | 5/2003 | Kroeker et al. ............. | 251/195 |
| 6,601,824 B2 | 8/2003 | Kroeker et al. ............. | 251/167 |

FOREIGN PATENT DOCUMENTS

JP        2002-009125        1/2002

\* cited by examiner

*Primary Examiner*—John Bastianelli
(74) *Attorney, Agent, or Firm*—Oblon, Spivak, McClelland, Maier & Neustadt, P.C.

(57) ABSTRACT

An opening/closing mechanism for a vacuum processing apparatus comprises a link mechanism comprising a supporting member having first and second valve elements for closing first and second opening portions, and a base end side member rotatably attached at a rear edge portion side of the supporting member through a rotation axis, a guide mechanism rotatably supporting the supporting member to a horizontal moving direction of the first and second valve elements while restricting the vertical moving range of the supporting member, first and second guide members which move the rotation axis of the link mechanism to a vertical direction and at the top portion to the horizontal direction, and first and second vertical moving mechanisms which vertically move the first guide member, the second guide member and the base edge side member.

6 Claims, 6 Drawing Sheets

OPENING/CLOSING MECHANISM FOR VACUUM PROCESSING APPARATUS AND VACUUM PROCESSING APPARATUS USING THE SAME

CROSS-REFERENCE TO RELATED APPLICATION

This application is based upon and claims the benefit of priority from the prior Japanese Patent Application Ser. No. 2004-368817 filed on Dec. 21, 2004, and the prior U.S. Patent Provisional Application No. 60/663,261 filed on Mar. 21, 2005; the entire contents of which are incorporated herein by reference.

BACKGROUND OF THE INVENTION

1. Field of the Invention

The present invention relates to a vacuum processing apparatus for vacuum processing such as an etching, film forming and the like of processing objects such as a semiconductor wafer under a vacuum atmosphere, and an opening/closing mechanism of the vacuum processing apparatus for opening and closing the opening portions of the vacuum processing apparatus.

2. Description of the Related Art

Conventionally, a vacuum processing apparatus of processing objects such as a semiconductor wafer under a vacuum atmosphere, for example, a vacuum processing apparatus for etching, film-forming and the like is known. As a vacuum processing apparatus, an apparatus in which a transfer mechanism is provided in a vacuum chamber (vacuum transfer chamber) and a plurality of vacuum processing chambers are connected to the vacuum transfer chamber so as to process with a high transfer efficiency, is known.

In the vacuum processing apparatus mentioned above, since the apparatus has a structure that the vacuum transfer chamber is connected to the vacuum processing chamber, it is necessary to provide opening portions for passing through respective processing objects into these vacuum chambers and to dispose these opening portions to face each other. Further, since such opening portions is required to be closed with an opening/closing mechanism, an opening/closing mechanism (gate valve) for the vacuum processing apparatus is provided such that the gate valve takes a position between these opening portions. As such opening/closing mechanism for the vacuum processing apparatus, a mechanism in which two valves are provided in one shaft, and the both opening portions are selectively closed with the valves is known (for example, Japanese Patent Laid-Open Application No. 2002-9125).

In the above opening/closing mechanism for the vacuum processing, it is possible to selectively close both two opening portions using one opening/closing mechanism. For example, when executing the maintenance of vacuum chamber and valve element at one side, it is possible to execute the maintenance in the state that another side is kept in a vacuum state.

However, in such opening/closing mechanism for the vacuum processing apparatus, total three driving mechanisms including a first driving mechanism for vertically moving the valve element, a second driving mechanism for pressing one valve element to one opening portion, and a third driving mechanism for pressing another valve element to another opening portion, are required. Consequently, there are problems that the miniaturization thereof has a limit and the manufacturing cost of apparatus becomes higher.

SUMMARY OF THE INVENTION

The present invention was made to solve the above-mentioned problems. The present invention provides a vacuum processing apparatus and an opening/closing mechanism for the vacuum processing apparatus which enable to decrease the manufacturing cost of the apparatus while miniaturizing the apparatus compared with the conventional apparatus.

According to an aspect of the present invention, there is provided an opening/closing mechanism for a vacuum processing apparatus which is possible to airtightly close first and second opening portions adjacently disposed to face each other in a vacuum processing apparatus for vacuum processing an object to be treated under a vacuum atmosphere, the opening/closing mechanism comprising a first valve element to close the first opening portion and a second valve element to close the second opening portion, a link mechanism comprising a valve element supporting member including the first and second valve elements which are disposed on a top portion of the supporting member to look towards an opposite direction with each other, and a base end side member rotatably attached at a rear edge portion side of the valve element supporting member through a rotation axis, a guide mechanism rotatably supporting the valve element supporting member to a horizontal moving direction of the first and second valve elements while restricting the vertical moving range of the valve element supporting member, a first guide member which moves the rotation axis of the link mechanism to a vertical direction in the vertical moving range which is restricted by the guide mechanism and at the top portion to the horizontal direction, a second guide member which moves the rotation axis of the link mechanism to a vertical direction in the vertical moving range which is restricted by the guide mechanism and at the top portion to the horizontal direction which is an opposite direction of the horizontal moving direction of the first guide member, a first vertical moving mechanism which vertically moves the base edge side member while vertically moving the first guide member, and a second vertical moving mechanism which vertically moves the base edge side member while vertically moving the second guide member.

According to another aspect of the present invention, there is provided the opening/closing mechanism for the vacuum processing apparatus mentioned above, wherein the first vertical moving mechanism moves up and down the base end side member with a moving speed of ½ of the moving speed of the first guide member, and the second vertical moving mechanism moves up and down the base end side member with the moving speed of ½ of the moving speed of the second guide member.

According to still another aspect of the present invention, there is provided the opening/closing mechanism for the vacuum processing apparatus mentioned above, wherein the first and second vertical moving mechanism comprises first and second racks disposed to face with each other, a pinion disposed between the first and second racks to be geared with the racks and rotatably attached to a rear end portion of the base end side member, a first driving mechanism vertically moving the first rack and a second driving mechanism vertically moving the second rack.

Further, according to an aspect of a vacuum processing apparatus of the present invention, there is provided with a vacuum processing apparatus for vacuum processing an object to be treated under a vacuum atmosphere, the apparatus comprising a first vacuum chamber having a first opening portion; a second vacuum chamber having a second opening portion disposed to face the first opening portion; a first valve element for closing the first opening portion; a second valve element for closing the second opening portion; a link mechanism comprising a valve element supporting member and a base end portion member, the valve element supporting member being provided to be between the first opening portion and the second opening portion and having first and second valve elements attached at a top portion thereof, wherein the first valve element is disposed to face a first opening portion side, the second valve element is disposed to face a second opening side which is opposite to the first opening portion side, and a base end side member rotatably attached at a rear edge portion side of the valve element supporting member through a rotation axis; a guide mechanism rotatably supporting the valve element. supporting member to a horizontal moving direction of the first and second valve elements while restricting the vertical moving range of the valve element supporting member; a first guide member which moves the rotation axis of the link mechanism to a vertical direction within the vertical moving range which is restricted by the guide mechanism, and at the top portion to the horizontal direction; a second guide member which moves the rotation axis of the link mechanism to a vertical direction within the vertical moving range which is restricted by the guide mechanism and at the top portion to the horizontal direction which is an opposite direction of the horizontal moving direction of the first guide member; a first vertical moving mechanism which vertically moves the base edge side member while vertically moving the first guide member; and a second vertical moving mechanism which vertically moves the base edge side member while vertically moving the second guide member.

Furthermore, according to another aspect of a vacuum processing apparatus of the present invention, there is provided the vacuum processing apparatus mentioned above, wherein the first vertical moving mechanism vertically moves the base end side member with a moving speed of ½ of a moving speed of the first guide member, and the second vertical moving mechanism moves the base end side member with a moving speed of ½ of a moving speed of the second guide member.

According to still another aspect of the present invention, there is provided the vacuum processing apparatus mentioned above, wherein the first and second vertical moving mechanisms comprise first and second racks disposed to face with each other, a pinion disposed between the first and second racks to be geared with the racks and rotatably attached to a rear end portion of the base end side member, a first driving mechanism vertically moving the first rack, and a second driving mechanism vertically moving the second rack.

DESCRIPTION OF THE EMBODIMENTS

Figure 1:
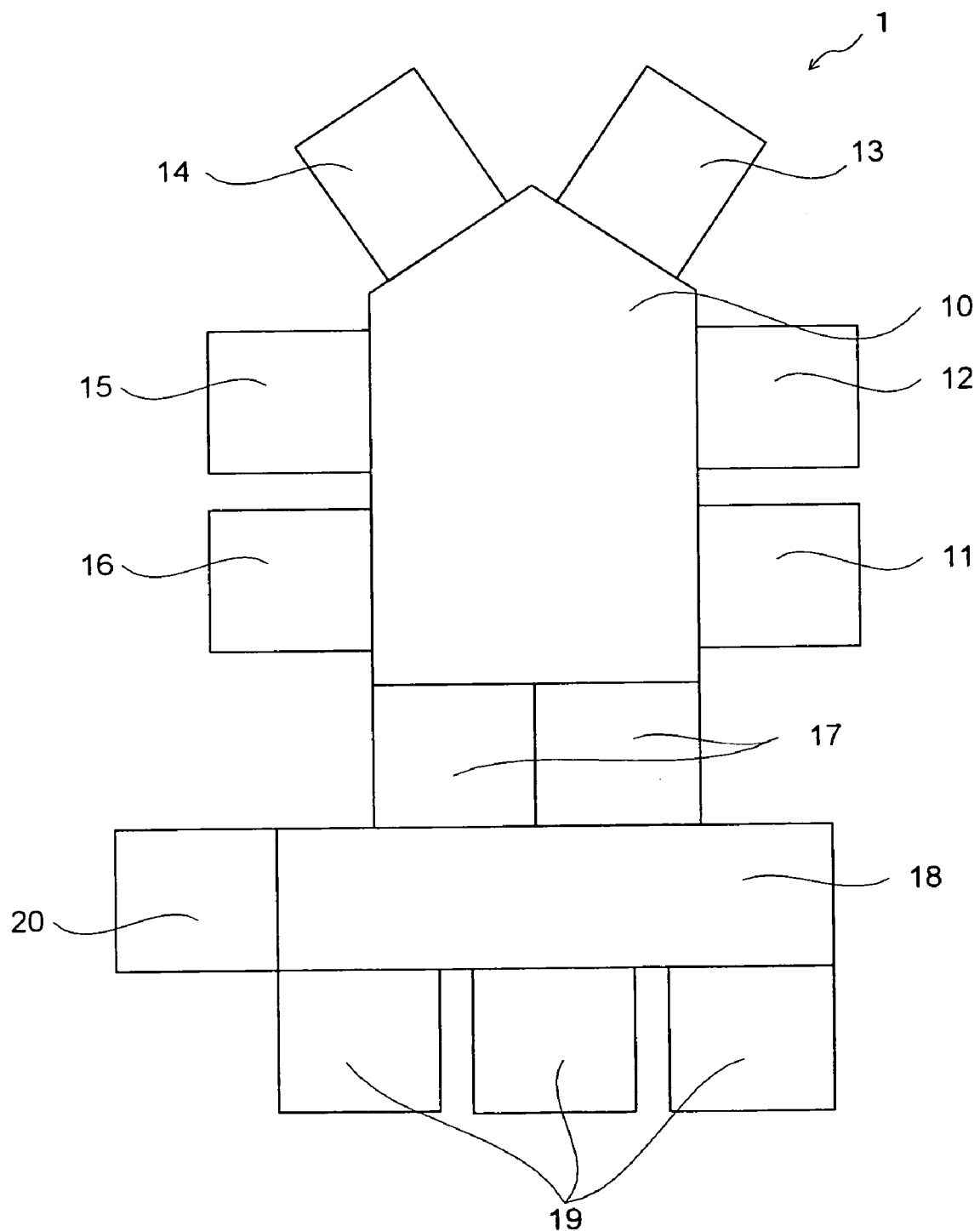
FIG. 1 is a view showing a schematic structure of the vacuum processing apparatus according to an embodiment of the present invention.

Hereunder, an embodiment of the present invention will be explained with reference to the drawings. FIG. 1 shows a whole structure of a vacuum processing apparatus according to an embodiment. As shown in FIG. 1, a vacuum transfer chamber 10 is provided in a center portion of a vacuum processing apparatus 1. Along the vacuum transfer chamber 10, a plurality of vacuum processing chambers (in the embodiment, six chambers) 11–16 are disposed to surround the vacuum transfer chamber 10.

At the front side (in FIG. 1, lower side) of the vacuum conveying chamber 10, two load lock chambers 17 are provided. Further at the front side (in FIG. 1, lower side) of the load lock chambers 17, a transfer chamber 18 for transfer a semiconductor wafer W in the atmosphere is provided. Furthermore, at the front side (in FIG. 1, lower side) of the transfer chamber 18, a plurality of mounting portions 19 (in FIG. 1, three portions), each for mounting a cassette or FOUP (Front Opening Unified Pods) which allows to receive plural semiconductor wafers therein is provided. At the side of the transfer chamber 18 (in FIG. 1, at left side), a positioning mechanism 20 for positioning the semiconductor wafer W by using an orientation flat or a notch is provided.

Figure 2:
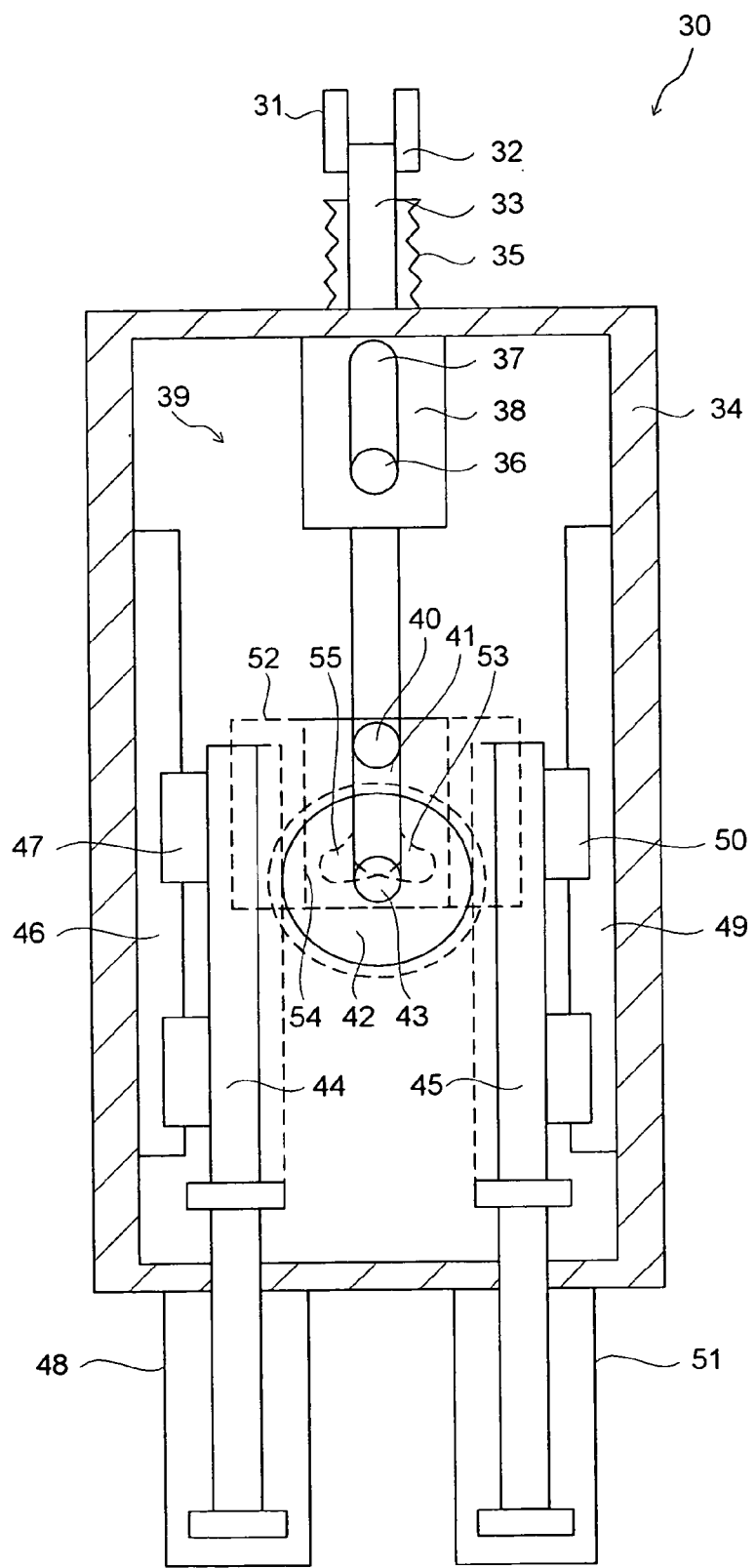
FIG. 2 is a view showing a cross sectional structure of the side of the opening/closing mechanism for the vacuum processing apparatus according to an embodiment of the present invention.
Figure 3:
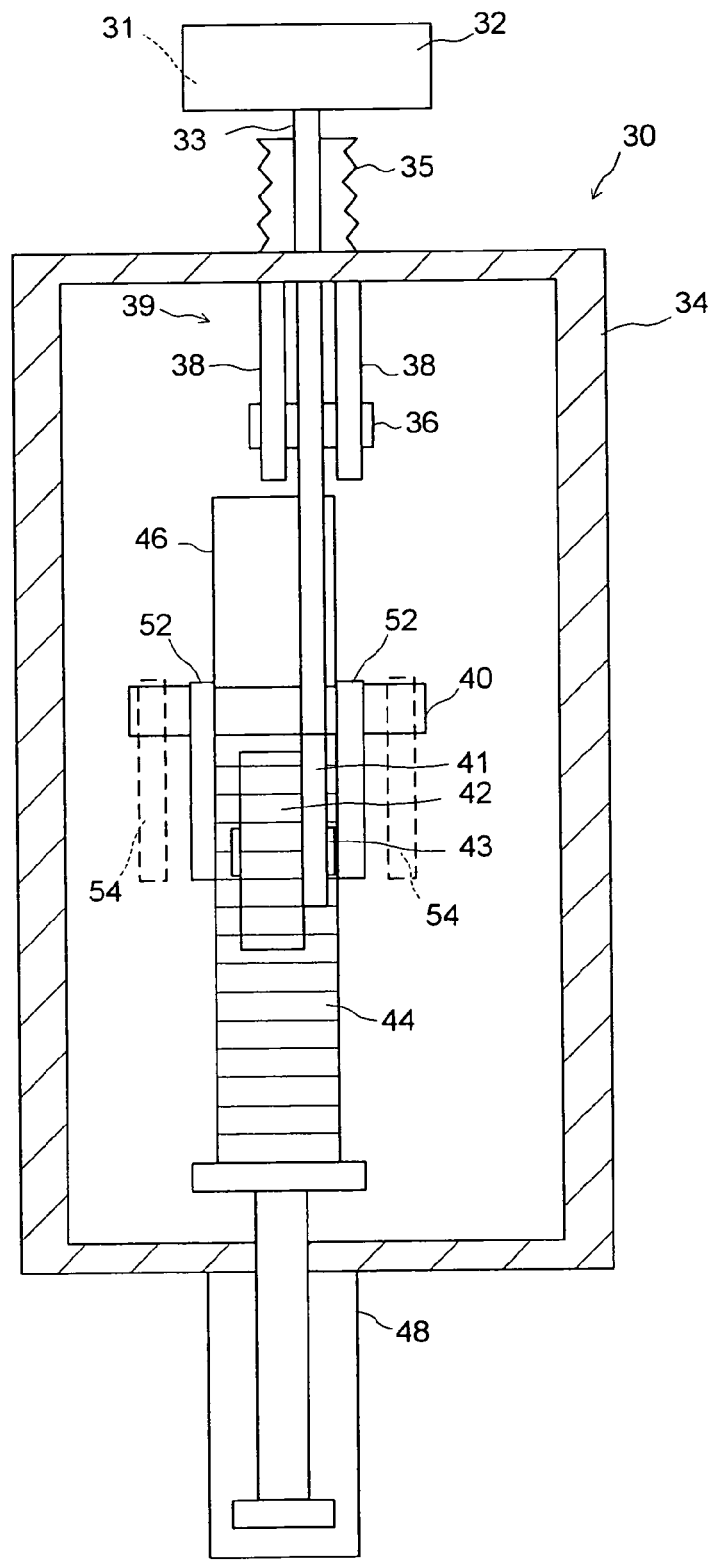
FIG. 3 is a view showing a cross section structure of the front of the opening/closing mechanism for the vacuum processing apparatus shown in FIG. 2.
Figure 4:
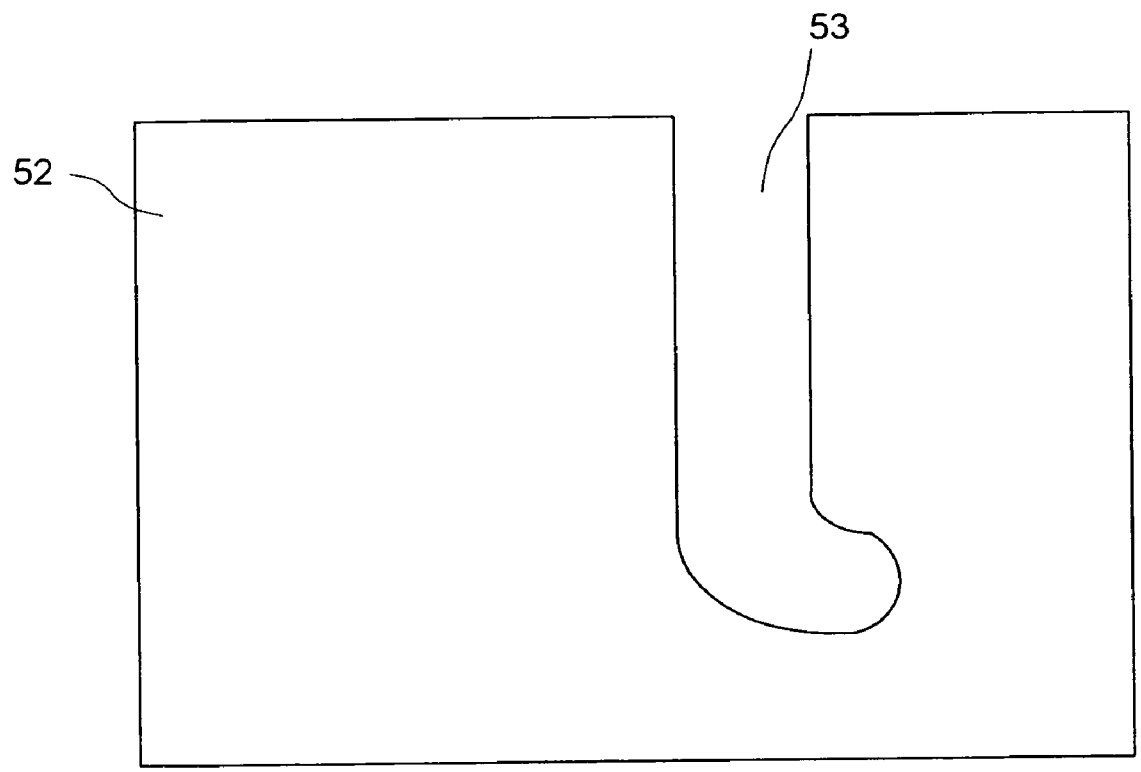
FIG. 4 is a view showing a schematic structure of an essential part of the opening/closing mechanism for the vacuum processing apparatus shown in FIG. 2.

Between the vacuum transfer chamber 10 and the vacuum processing chambers 11–16, an opening/closing mechanism 30 for vacuum processing apparatus which has a structure as shown in FIGS. 2–4, is disposed. The opening/closing mechanism 30 for the vacuum processing apparatus has a first valve element 31 for closing opening portions at the vacuum processing chamber 11–16 side, and a second valve element 32 for closing opening portions at the vacuum transfer chamber 10 side.

The first valve element 31 and the second valve element 32 are disposed at the top portion (in FIGS. 2 and 3, upper side) of a valve element supporting member 33 having a plate shape to look towards the opposite directions each other. The valve element supporting member 33 is disposed such that the top portion of the supporting member 33 protrudes from the upper portion of a housing 34. Between the valve element supporting member 33 and the upper surface of the housing 34, a bellows 35 for airtightly closing therebetween is provided.

At the center portion of the valve element supporting member 33 which is located in the housing 34, a guide projection 36, which is protruded towards the both sides thereof and has a round bar shape, is provided, as shown in FIG. 3. Conforming to the guide projection 36, two guide plates 38 provided with a long hole shaped guide hole 37 are disposed with a predetermined distance. By inserting the guide projection 36 into the guide hole 37 of the guide plate 38, a guide mechanism 39 rotatably supporting the valve element supporting member 33 in the horizontal moving directions of the first valve element 31 and the second valve element 32 while restricting the range of vertical moving is constituted.

At the rear end portion side of the valve element supporting member 33, one end of a base end side member 41 having a plate shape is rotatably attached through a rotating axis 40. By these base end side member 41 and the valve element supporting member 33, a link mechanism is constituted. Another end of the base end side member 41 is rotatably attached to a center axis 43 of a pinion 42. The pinion 42 is disposed to be held between a first rack 44 and a second rack 45 which are disposed to face each other, and to be engaged with these racks.

The first rack 44 is constituted to vertically move with a first linear guide 46 which is fixed to an inner wall of the housing 34, a first slider 47, and a first air cylinder 48 as a driving mechanism. The second rack 45 is similarly constituted to vertically move with a second linear guide 49 which is fixed to an inner wall of the housing 34, a second slider 50, and a second air cylinder 51 as a driving mechanism.

To the first rack 44, a first guide member 52 to guide the rotating axis 40 is attached. Here, in FIG. 2, the first guide member 52 and a second guide member 54 described later are shown with a dotted line to clearly explain the structure of other overlapped members.

The first guide member 52 has a plate shape, as shown in FIG. 4, and provides a first guide hole 53 to guide the rotating axis 40 mentioned above. The first guide hole 53 has an upper portion which has a straight shape along the vertical direction, and has a lower end which has a curved shape in a horizontal direction. And within the vertical moving range of the valve element supporting member 33 which is restricted by the guide mechanism 39 mentioned above, the rotating axis 40 is guided to the vertical direction, and after the valve element supporting member 33 is arrived at the top portion, the rotating axis 40 is guided to move in the horizontal direction. As above, by moving the rotating axis 40 in the horizontal direction, the valve element supporting member 33 is rotated around the guide projection 36 as an axis, thereby the first valve 31 and the second valve element 32 being moved in the horizontal direction. As shown in FIG. 3, two members of the first guide member 52 are attached to the both sides of the valve element supporting member 33, and guide the both sides of the rotating axis 40.

To the second rack 45, the second guide member 54 to guide the rotating axis 40 of the link mechanism is attached. In the second guide member 54, a second guide hole 55 which is curved in an opposite direction to the first guide hole 53 of the first guide member 52 is provided. Consequently, the second guide member 54 turns the valve element supporting member 33 to the opposite direction to the first guide member 52, thereby the first valve element 31 and the second valve element 32 being horizontally moved to the opposite directions each other. As shown with dot lines in FIG. 3, total two members of the second guide member 54 are also provided at both sides of the valve element supporting member 33 to guide both sides of the rotating axis 40.

The above mentioned opening and closing mechanism 30 for the vacuum processing apparatus is disposed, for example, between the vacuum transfer chamber 10 and the vacuum processing chambers 11–16, such that the opening portions of the vacuum processing chambers 11–16 are disposed at the first valve element 31 side, and the opening portions of the vacuum transfer chamber 10 are disposed at the second valve element 32 side. And, the first valve element 31 closes the opening portions at the vacuum processing chamber 11–16 side, and the second valve element 32 closes the opening portions at the vacuum transfer chamber 10 side.

When the opening portions at the vacuum processing chamber 11–16 side is closed with the first valve element 31, the first rack 44 is risen using an air cylinder 48 from the state shown in FIG. 2. When the first rack 44 is risen, pinion 42 geared therewith is risen a distance of ½, at a speed of ½ of the first rack, while-rotating.

Figure 5:
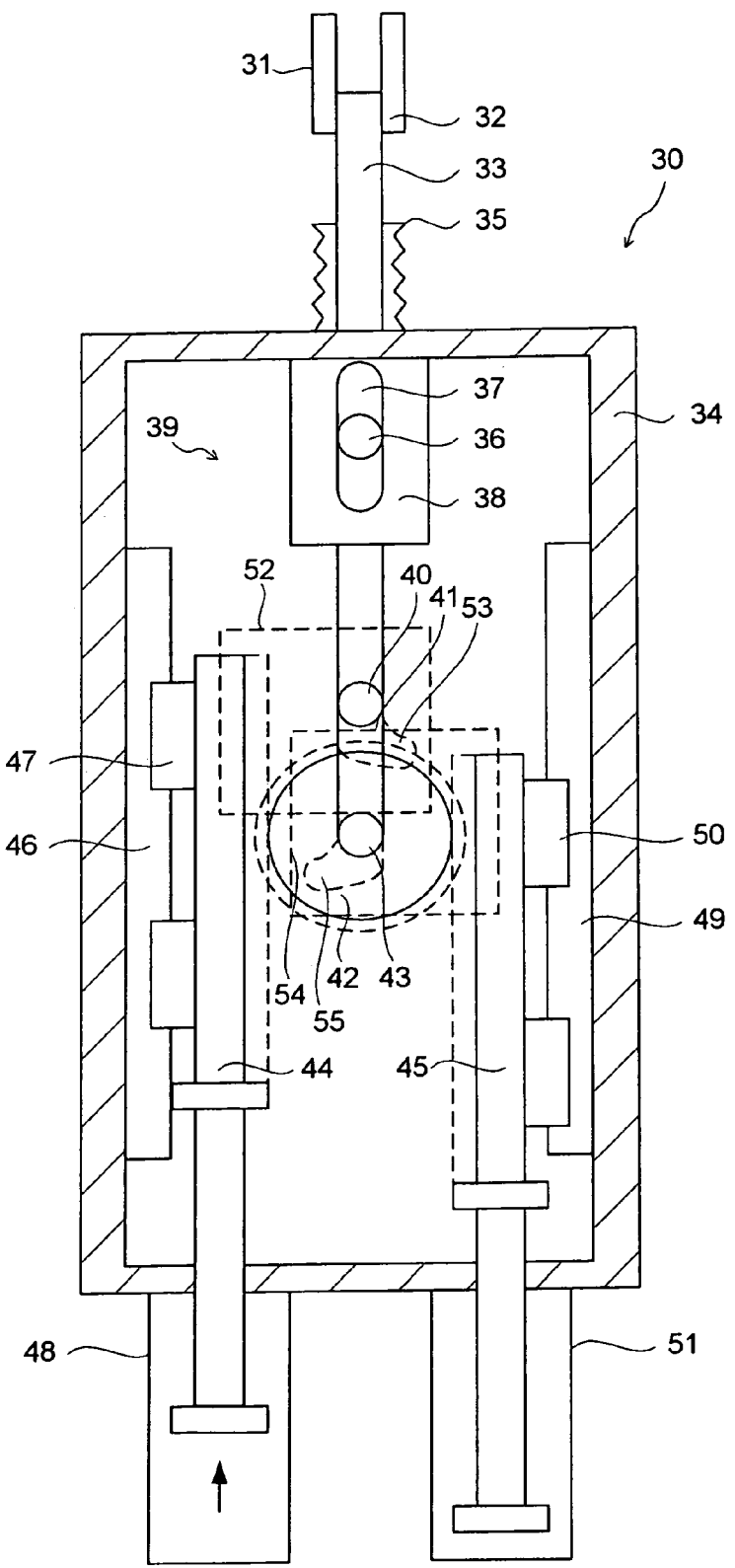
FIG. 5 is a view for explaining an operation of the opening/closing mechanism for the vacuum processing apparatus shown in FIG. 2.

At this time, as shown in FIG. 5, the rotating axis 40 of the link mechanism is linearly guided by the linear portion of the first guide hole 53 of the first guide member 52, thereby the valve element supporting member 33 being linearly risen. Further, together with the first rack 44, the first guide member 52 is risen.

Figure 6:
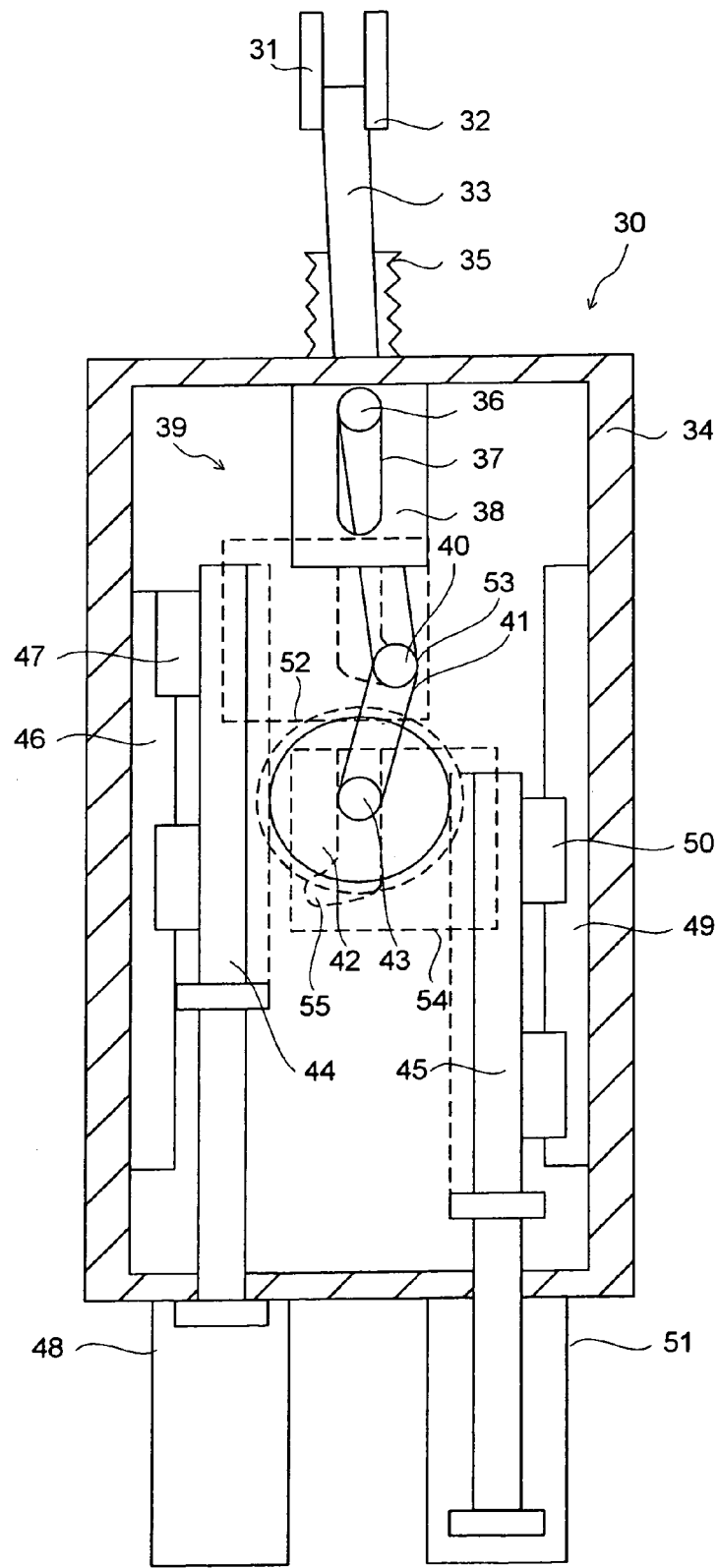
FIG. 6 is a view for explaining an operation of the opening/closing mechanism for the vacuum processing apparatus shown in FIG. 2.

As mentioned above, when the valve element supporting member 33 is risen to the top portion in the vertical moving range of the valve element supporting member 33 restricted by the guide mechanism 39, the rotating axis 40 is guided to move in a horizontal direction (right direction in FIG. 6) by the lower curved portion of the first guide hole 53 of the first guide member 52. Then, the valve element supporting member 33 turns around the guide projection 36 as a rotating axis, and the first valve element 31 moves to a horizontal direction (left direction in FIG. 6) and closes the opening portions of the vacuum processing chamber at the vacuum processing chamber 11–16 side. In addition, at this time, since the second guide member 54 remains in a lower portion together with the second rack 45, the rotating axis 40 is in a state that is removed from the second guide hole 55 of the second guide member 54. Accordingly, the second guide hole 55 does not disturb the horizontal moving of the rotating axis 40.

According to the above procedures, the opening portions at the vacuum processing chambers 11–16 side are closed. Further, when opening the opening portions at the vacuum processing chambers 11–16 side, the first air cylinder 48 is contracted, and the first rack 44 is gone down. Thereby, using an opposite operations with the above mentioned operations, after the first valve element 31 is moved in a horizontal direction and is gone down, the opening portions at the vacuum processing chambers 11–16 side is opened.

In the vacuum processing apparatus 1, when conducting a usual vacuum processing, opening portions at the side vacuum processing chambers 11–16 are closed with a first valve element 31, and when a semiconductor wafer W is carried into the vacuum processing chambers 11–16 or carried out therefrom, the opening portions are opened. And, when a maintenance at the side of vacuum processing chamber is carried out, for example, when the maintenance of the first valve element 31 and the like are carried out, the second rack 45 is risen with the second air cylinder 51. Thereby, similarly with the case of the first valve element 31, the opening portion of the vacuum transfer chamber 10 side which is a opposite side is closed with the second valve element 32.

Thus, by closing the opening portions at the vacuum transfer chamber 10 side, in a state that the vacuum processing chambers 11–16 is separated from the side of the vacuum transfer chamber 10, the vacuum processing chambers 11–16 are opened in the atmosphere, thereby the maintenance thereof can be carried out. Thus, the down time of the vacuum processing apparatus can be decreased and then the efficiency of operation can be improved.

In addition, since it is possible to close two opening portions by driving the first valve element 31 and the second valve element 32 using only two air cylinders comprising a first air cylinder 48 and a second air cylinder 51 as a driving mechanism, the decreasing of manufacturing cost can be achieved compared with the case of using three or more driving mechanisms. Further, as mentioned above, since the second air cylinder 51 does not be used at the time of usual vacuum processing, instead of the second air cylinder 51, the rising mechanism of the second rack 45, for example, by using a manual rotating of a screw, may be allowed to be provided. By such method, since the number of air cylinder is decreased to one, the manufacturing cost can be decreased and realizing the miniaturization of the apparatus.

In the above embodiment, we have described the vertical moving mechanism in which by using the first rack 44, the second rack 45 and the pinion 42, the base end side member 41 is vertically moved with a speed of ½ of the speed of the first guide member 52 while vertically moving the first guide member, and the base end side member 41 is vertically moved with a speed of ½ of the speed of the second guide member 54 while vertically moving the second guide member 54. However, it is allowed to constitute such a vertical moving mechanism by using other mechanism.

For example, by using a rotating member such as a moving pulley and a belt for driving the rotating member instead of the two racks and pinions, the similar vertical moving mechanism may be constituted. That is, in this case, the mechanism comprises first and second driving mechanisms each of which can be vertically moved independently and is disposed with a distance, and a belt connected to respective another end portion of the first and second driving mechanisms and laid between the first and second driving mechanisms, a rotating member which is put between the belts and rotatably moved such as a moving pulley, and rotatably attached to the rear end portion of the base end side member. In this constitution, it is possible to realize similar operation and effect as the case of using two racks and pinions. Further since a contact area between the rotating member and the belt becomes larger, the transmitting of driving force can be smoothly conducted.

Next, we will describe an operation of vacuum processing in the vacuum processing apparatus 1 of the above embodiment of the invention. When a cassette or FOUP is mounted on the mounting portion 19, a semiconductor wafer W is taken out from the cassette or FOUP by the transfer mechanism (not shown) provided in the transfer chamber 18, and after transfer to the position mechanism 20 and positioning, the semiconductor wafer W is disposed in the load lock chamber 17.

And by using a transfer mechanism (not shown in FIG. 1) provided in the vacuum transfer chamber 10, the semiconductor wafer W is carried from the load lock chamber 17 to respective vacuum processing chambers 11–16 and is treated according to the predetermined processing. And then, the treated semiconductor wafer W is carried from respective vacuum processing chambers 11–16 using the transfer mechanism into the load lock chamber 17 and disposed therein.

Then, the semiconductor wafer W treated as described above, which is disposed in the load lock chamber 17, is taken out from the load rock chamber 17 using the transfer mechanism in the transfer chamber 18, and is received in the cassette or FOUP mounted on the mounting portion 19.

When the above vacuum processing is conducted, opening portions between the vacuum transfer chamber 10 and the vacuum processing chambers 11–16 are opened and closed by the opening/closing mechanism 30 for the vacuum processing apparatus.

As described above, the opening/closing mechanism for vacuum processing and the vacuum processing apparatus of the present embodiment enables to miniaturize the apparatus compared with the conventional apparatus and simultaneously to decrease the manufacturing cost thereof.

What is claimed is:

1. An opening/closing mechanism for a vacuum processing apparatus which enables to airtightly close first and second opening portions closely disposed to face each other in a vacuum processing apparatus for vacuum processing an object to be treated under a vacuum atmosphere, the opening/closing mechanism, comprising:
    a first valve element for closing the first opening portion and a second valve element for closing the second opening portion;
    a link mechanism comprising a valve element supporting member including the first and second valve elements which are disposed on a top portion of the supporting member to look towards an opposite direction with each other, and a base end side member rotatably attached at a rear edge portion side of the valve element supporting member through a rotation axis;
    a guide mechanism rotatably supporting the valve element supporting member to a horizontal moving direction of the first and second valve elements while restricting the vertical moving range of the valve element supporting member;
    a first guide member which moves the rotation axis of the link mechanism to a vertical direction within the vertical moving range which is restricted by the guide mechanism, and at the top portion to the horizontal direction;
    a second guide member which moves the rotation axis of the link mechanism to a vertical direction within the vertical moving range which is restricted by the guide mechanism and at the top portion to the horizontal direction which is an opposite direction of the horizontal moving direction of the first guide member;
    a first vertical moving mechanism which vertically moves the base edge side member while vertically moving the first guide member; and
    a second vertical moving mechanism which vertically moves the base edge side member while vertically moving the second guide member.

2. The opening/closing mechanism for the vacuum processing apparatus according to claim 1,
    wherein the first vertical moving mechanism vertically moves the base end side member with a moving speed of ½ of a moving speed of the first guide member, and
    wherein the second vertical moving mechanism moves the base end side member with a moving speed of ½ of a moving speed of the second guide member.

3. The opening/closing mechanism for the vacuum processing apparatus according to claim 2,
    wherein the first and second vertical moving mechanism comprises first and second racks disposed to face with each other, a pinion disposed between the first and second racks to be geared with the racks and rotatably attached to a rear end portion of the base end side member, a first driving mechanism vertically moving the first rack, and a second driving mechanism vertically moving the second rack.

4. A vacuum processing apparatus for vacuum processing a processing object under a vacuum atmosphere, comprising:
    a first vacuum chamber having a first opening portion;

a second vacuum chamber having a second opening portion disposed to face the first opening portion;

a first valve element for closing the first opening portion;

a second valve element for closing the second opening portion;

a link mechanism comprising a valve element supporting member and a base end portion member, the valve element supporting member being provided to be between the first opening portion and the second opening portion and having first and second valve elements attached at a top portion thereof, wherein the first valve element is disposed to face the first opening portion side, the second valve element is disposed to face the second opening side which is opposite to the first opening portion side;

a base end side member rotatably attached at a rear edge portion side of the valve element supporting member through a rotation axis;

a guide mechanism rotatably supporting the valve element supporting member to a horizontal moving direction of the first and second valve elements while restricting the vertical moving range of the valve element supporting member;

a first guide member which moves the rotation axis of the link mechanism to a vertical direction within the vertical moving range which is restricted by the guide mechanism, and at the top portion to the horizontal direction;

a second guide member which moves the rotation axis of the link mechanism to a vertical direction within the vertical moving range which is restricted by the guide mechanism and at the top portion to the horizontal direction which is an opposite direction of the horizontal moving direction of the first guide member;

a first vertical moving mechanism which vertically moves the base edge side member while vertically moving the first guide member; and a second vertical moving mechanism which vertically moves the base edge side member while vertically moving the second guide member.

5. The vacuum processing apparatus according to claim 4, wherein the first vertical moving mechanism vertically moves the base end side member with a moving speed of ½ of a moving speed of the first guide member, and wherein the second vertical moving mechanism vertically moves the base end side member with a moving speed of ½ of a moving speed of the second guide member.

6. The vacuum processing apparatus according to claim 5, wherein the first and second vertical moving mechanisms comprise first and second racks disposed to face with each other, a pinion disposed between the first and second racks to be geared with the racks and rotatably attached to a rear end portion of the base end side member, a first driving mechanism vertically moving the first rack, and a second driving mechanism vertically moving the second rack.

* * * * *